United States Patent
Thoennessen et al.

(10) Patent No.: US 9,431,648 B2
(45) Date of Patent: Aug. 30, 2016

(54) METHOD FOR FILLING ELECTROCHEMICAL CELLS

(71) Applicant: Fraunhofer-Gesellschaft zur Foerderurg der angewandten Forschung e.V., Munich (DE)

(72) Inventors: Torge Thoennessen, Hamburg (DE); Gerold Neumann, Halstenbek (DE)

(73) Assignee: Fraunhoder-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/430,462

(22) PCT Filed: Sep. 24, 2013

(86) PCT No.: PCT/EP2013/069842
§ 371 (c)(1),
(2) Date: Mar. 23, 2015

(87) PCT Pub. No.: WO2014/048918
PCT Pub. Date: Apr. 3, 2014

(65) Prior Publication Data
US 2015/0270530 A1    Sep. 24, 2015

(30) Foreign Application Priority Data
Sep. 25, 2012    (DE) .................. 10 2012 109 032

(51) Int. Cl.
*H01M 2/36* (2006.01)
*H01M 10/0525* (2010.01)
*H01M 10/48* (2006.01)

(52) U.S. Cl.
CPC ............. *H01M 2/365* (2013.01); *H01M 2/362* (2013.01); *H01M 10/0525* (2013.01); *H01M 10/484* (2013.01); *Y02E 60/122* (2013.01); *Y02T 10/7011* (2013.01); *Y10T 29/4911* (2015.01)

(58) Field of Classification Search
CPC ............... H01M 2/365; H01M 2/362; H01M 10/0525; H01M 10/4845
See application file for complete search history.

(56) References Cited

U.S. PATENT DOCUMENTS

| | | | |
|---|---|---|---|
| 6,371,996 | B1 | 4/2002 | Takayama et al. |
| 2002/0106555 | A1 | 8/2002 | Langan |

(Continued)

FOREIGN PATENT DOCUMENTS

| | | |
|---|---|---|
| DE | 19911800 | 11/2000 |
| DE | 102009057155 | 6/2011 |

(Continued)

*Primary Examiner* — Helen O Conley
(74) *Attorney, Agent, or Firm* — Duane Morris LLP

(57) ABSTRACT

The invention relates to a method for filling a battery or accumulator foil bag with fluid and sealing said bag, comprising the steps:
a) providing a flexible foil pouch in the interior of which the solid components (8; 31) of the battery and/or accumulator are accommodated, wherein the foil pouch is tightly sealed with the exception of a sealable opening (11, 12) accessible for fluid,
b) situating the foil pouch in a gas-tight sealable chamber (21) and gas-tight sealing of the chamber,
c) following step (b), applying a vacuum in the foil bag,
d) connecting the fluid access port on the foil pouch to a fluid source reservoir (17) via a connecting tube (14; 29), forming a tight seal,
e) following step (d), completely filling the pouch interior with fluid via the connecting tube and
f) hermetically sealing the foil pouch by placing a seam (10; 36), wherein either
  (i) the seam is placed such that the fluid access port connected to the connecting tube is separated from the interior of the foil pouch and the connecting tube is subsequently removed from the fluid access port, or
  (ii) the seam extends through the connecting tube, and,
g) separating the foil and/or connecting tube components (37) that are situated outside the seam.

19 Claims, 6 Drawing Sheets

(56) References Cited

U.S. PATENT DOCUMENTS

| | | |
|---|---|---|
| 2006/0137168 A1 | 6/2006 | Futscher et al. |
| 2006/0260713 A1 | 11/2006 | Pyszczek et al. |
| 2010/0323233 A1 | 12/2010 | Hennige et al. |
| 2014/0017547 A1 | 1/2014 | Eichinger |

FOREIGN PATENT DOCUMENTS

| | | |
|---|---|---|
| EP | 1045463 | 10/2000 |
| EP | 1396037 | 5/2006 |
| EP | 1708295 | 7/2010 |
| EP | 2393146 | 12/2011 |
| GB | 2329513 | 3/1999 |
| WO | 03005464 | 1/2003 |

METHOD FOR FILLING ELECTROCHEMICAL CELLS

The invention relates to a method for the controlled filling of form- and size flexible electrochemical energy storage devices, such as accumulators (so-called "pouch cells") with potentially corrosive electrolytic fluids (hereinafter also simply referred to as "electrolyte") based on an organic solvent without danger of contaminating the foil pouch or the working environment with electrolyte and without the risk of residual gas bubbles remaining inside the pouch. This method has significant advantages over technically established methods. In particular, controlled pressure conditions can be set and hermetically separated compartments employed to achieve a force-feed-free filling of the pouch cell compartments. In a particular embodiment of the invention, the energy storage device is provided with perforated electrode foils so as to improve absorption of the electrolyte.

The present invention thus relates to a method step in the process chain for producing electrochemical energy storage devices such as accumulators. The method step relates to a step in which electrolyte fluid is filled into a cell that is already completely assembled so as to electrochemically activate the cell, thereby enabling ion transport between the anode and cathode.

Since the early 1990s, electrochemical energy storage devices based on lithium technology, such as lithium accumulators, batteries or supercaps (the latter being the general term for so-called super capacitors, mostly double-layer capacitors with high capacity) have gradually become the dominant electrochemical storage technology on the market, in particular for consumer applications. Their major advantages are high energy densities with high operating life and high robustness. For consumer applications, cells with rather low energy content ranging from several watt-hours to several tens of watt-hours are required. However, there is a rapidly increasing demand for large cells having energy contents of up to several 100 watt-hours as a result of the rapidly increasing interest in large storage systems for, e.g. battery-powered electric vehicles or for intermediate storage of electrical energy that is generated by renewable energy sources. The production of large cells poses new challenges on production technology. Lithium storage cells can be assembled using various technology variants.

Among the most widely used lithium cells a distinction is made between lithium-ion accumulators and lithium (ion)-polymer accumulators.

Lithium-ion cells are comprised of the anode and cathode electrode foils that are separated by the separator and accommodated in a rigid metal housing. The active layers having the properties of an anode and/or a cathode are deposited as thin layers on generally uninterrupted metal foils and are available as semi-finished products for cell assembly. The electrodes themselves are comprised of a composite of active particles to which conductive carbon black is frequently added so as to improve conductivity. The particles are held together by a plastic based binder that may, for example, be comprised of polyvinylidene fluorides of different chain lengths, with or without co-polymer. Water-soluble binders are also increasingly being used, such as in mixtures of styrene-butadiene rubber, and carboxymethylcellulose. Known anode materials are, for example, graphite, amorphous carbon, silicon, lithium titanate or tin compounds. Cathode materials employed are particularly lithium cobalt oxide, lithium nickel cobalt aluminum oxide, lithium nickel cobalt manganoxide, lithium manganese phosphate, lithium iron phosphate, lithium cobalt phosphate, or lithium vanadiumpentoxide. Those skilled in the art are familiar with other anode and cathode materials. Separators are electronically insulating thin films, such as polymer films that are characterized by high micro-porosity and may comprise ceramic components, which improve wetting with the electrolyte and the ionic conductivity in the separator. The required ionic conductivity in the cell is achieved by addition of a precisely metered amount of a fluid electrolyte to a cell stack and/or a coil, consisting of anode foil, cathode foil and separator. The electrolyte is typically a lithium salt (the so-called conducting salt) that is dissolved in an organic solvent or in a mixture of two or more solvents. The solvents are preferably carbonates such as ethylene carbonate, propylene carbonate, dimethyl carbonate, diethyl carbonate, ethylmethyl carbonate or gamma-butyrolactone. Those skilled in the art are familiar with a variety of other solvents. As conducting salts are employed lithium hexafluorophosphate, lithium perchlorate, lithium tetrafluoroborate or lithium bis(oxalato)borate. Here too, further lithium salts are known to the skilled person. The electrolyte must penetrate through the entire battery body. This is achieved during manufacture of electrode films by a process control achieving microporosity that must also be a property of the separator. The fluid electrolyte is drawn into the micropores thus obtained by capillary forces. Satisfactory and uniform distribution of the electrolyte throughout the entire foil composite is essential for the functionality of the lithium cell.

Lithium-ion polymer cells are assembled following the same basic concept. However, the housing is not a rigid metal housing, but usually a plastic-coated metal foil, such as a laminated aluminum foil, which is often referred to as "pouch foil." Therefore, the term pouch- or coffee bag technology is also used for this technology variant.

To arrest the fluid electrolyte in polymer cells using foil housings, binders are often used in electrode production that gel completely or to a certain degree with the solvents of the fluid electrolyte, and thus bind the electrolyte. Likewise, with this variant of the technology, the homogeneous distribution of the fluid electrolyte is essential to functionality of the cell.

Cells are constructed either as prismatic cells or as cylindrical cells. Prismatic cells have a rectangular outer shape. Especially pouch cells are generally of prismatic shape. The advantage of prismatic cells is that they allow improved heat dissipation because the ratio of the cell volume to the cell surface is favorable for heat dissipation. Therefore, particularly large cells with a high-energy content are often designed as prismatic pouch cells. In cylindrical cells, the electrode and separator films are present in wound form.

The manufacture of cells using pouch technology can be performed by stacking or winding technology. In the winding technology, a length of the three foils (anode foil, separator foil, cathode foil) are wound such that the target capacity of the cell is achieved. Of course, care must be taken that the external electrode foil of an inner winding and the inner electrode foil of an outer winding are separated by a non-conductive material.

In the stacking technology a number of foil sheets are placed in the required order on top of each other until the target capacity is reached. The requirement for anode and cathode foils being separated by a nonconductive material naturally applies here as well. The anode foils and cathode foils being separated by one or more separators are welded to a current conductor plate or other types of conductors or connected in any other way in order to realize electrical current flow from the cell to be hermetically sealed. These stackings, equipped with current conductor plates or the like, are enclosed in the further manufacturing process by a pouch-foil bag (also referred to as a pouch), and saturated with electrolyte. The electrolyte is often a health hazard and sensitive even to the slightest traces of moisture. The solvents typically used often have a high vapor pressure. The pouch foil is distinguished by the fact that, firstly, it must be inert to corrosive salts and, secondly, inert to aggressive organic solvents and must be welded by a heat-sealing process. The hermetic sealing of pouch bags in the manufacture of accumulators poses a major challenge to processing techniques, since the pouch foils typically used are prone to buckling and breakage, the corrosion-inhibiting plastic layers prone to damage and the cut edges of the films exposed to corrosion. Commercial products that meet these requirements, however, are commercially available. With the current manufacturing methods, the cell body together with the current conductor plates is typically arranged between the pouch foil packaging and prepared for electrolyte filling by a three-sided sealing. After electrolyte filling, the remaining side is closed by an additional sealing step.

This method has a number of insufficiently resolved problems, in particular those relating to the step of filling the pouch bag with electrolytes that may have permanent negative effects on the performance, durability and safety of the accumulators.

Problems with introduction of fluid electrolyte are described, for example, in DE 10 2009 057 155 A1 where carryover or droplets may be formed causing undesired contamination of the surfaces of the cell with electrolyte fluid. For example, in the presence of air or moisture, corrosive compounds may be generated on the in part metallic surfaces of the cell. This affects the durability of the cell, both in terms of cycle robustness as well as in terms of calendric life. Such contamination must therefore be prevented. With pouch cells, contact of electrolyte fluid with areas of the seam to be sealed in the outer envelope, generally in a foil bag of the type described above, must further be avoided, as otherwise secure and permanent sealing cannot be ensured. Simply wiping and washing off the fluid electrolyte does not suffice, since capillary action has generally already caused the electrolyte fluid to penetrate into unreachable areas of the contaminated component.

WO 03/005464 A2 describes a technical device, which makes a cell that is already sealed on three sides accessible to filling via a filling nozzle. To this end, reduced-contamination filling by positively driven electrolyte metering is described that is accomplished by means of a feed pump. The filling device comprises a means for retaining electrolyte and for aspirating excess droplets.

The object of DE10 2009 057155 A1 is the further development of this technology. The essential feature of this application is that the filling tube for electrolyte metering is surrounded axially by an adjustable filling sleeve so as to further avoid contamination of the cell during electrolyte metering.

Modern accumulators are generally prepared with closed metal foils serving as electrode foil substrate and in a large format (highly capacitive cells result), as this benefits the design and integration of cells for the respective application. Nevertheless, it must be ensured that during cell filling the electrolyte penetrates quickly and reliably into the electrode film stack and interfuses and wets it completely. The electrolyte must thereby penetrate into the pores of the layers, whereby, when closed current output foils are employed that are generally preferred for reasons of cost, only a small cross-section of penetration and a long diffusion distance that must be overcome can be advantageously used, see FIG. 3. Furthermore, the existing gas present in the pores (usually protective inert gas) must be displaced. Although penetration of electrolyte into the layers is promoted by capillary forces, this displacement is not very efficient when the electrolyte can diffuse through only a small penetration cross-section into the cell body, and, moreover, when the separator is also intimately connected to the electrode foils (e.g. via lamination of the organic components of the layers).

The difficulties with this process have led to the development of so-called vacuum-electrolyte-filling methods that are all of similar technical basic design. To this end, one or more partially closed, for example on three sides, cells are placed in a separate atmosphere (e.g. glove box environment) under a protective gas atmosphere in an evacuated chamber and electrolyte fluid is injected into the top edge of the cell (head) via a filling device as described in WO 03/005 464 A2 or DE 10 2009 057155 A1. Either the electrolyte is thereby injected directly into a vacuum that was previously established in the chamber, or the electrolyte is pumped into the cell at ambient pressure and the chamber is subsequently evacuated to remove the volume of gas present in the pores of the layers, thereby improving the penetration of the layers with electrolyte as capillary forces are most active. The steps of injecting electrolyte and evacuating after vacuum release may be optionally repeated several times. Subsequently, vacuum is applied and the cell is sealed at the head seam via a hot-sealing process, the vacuum is then interrupted, and the cell removed from the filling station. An additional component of such filling station may be a pre-forming device that applies a potential to the cell prior to the final sealing step at the head seam. This has the advantage that the action of the potential may cause potential gas bubbles to form early, such as those bubbles that occur in some constellations as a result of reaction of the electrolyte with impurities or with an electrode surface within the cell. Measures for removing the gas bubbles can therefore be taken before the final cell sealing.

Due to the high volatility of the organic solvents, which constitute the main component of the electrolyte fluids, problems arise with this technology: During injection of electrolyte into the vacuum or during evacuation of the (partially) filled cell a significant portion of the volatile components of the electrolyte evaporates and thereby contaminates all surfaces of the chamber. This is particular problem for sensitive electronic components that are to be subjected to an optional pre-forming, for viewing windows, and for the integrated sealing station. Any components that come into contact with the electrolyte must therefore be maintained in an inert gas atmosphere, causing the overall design to be expensive and maintenance-intensive. The many components and required system design per ATEX Directive (Atmosphere Explosive) additionally increase the manufacturing costs of this method.

A further disadvantage is that the composition of the electrolyte changes due to vaporization of individual volatile electrolyte components, and the rapid reduction of pressure applied in this approach further causes the electrolyte to foam, leading to the aforementioned contamination of the environment with corrosive electrolyte salts that must absolutely be avoided. In addition, with open vacuum filling, the final pressure that can be typically achieved is reduced by the vapor pressure of the electrolyte, so that the desired capillary force supporting penetration of the cell body cannot be fully realized.

Aside from vacuum filling, other variants have been described that facilitate the distribution of electrolyte in the battery body. One possibility is the use of current conductors having openings. The use of drawn metal is disclosed in EP 1 570 113 B1. The use and manufacture of drawn metals, however, is expensive and they do not allow direct coating of the electrode mass onto the current conductor. Additional process steps such as relaminating the electrode foil deposited onto the carrier foil onto the drawn metal require high effort. A filling method of a battery-foil pouch is known from EP 1 396 037 A2 in which the foil pouch is first welded so as to situate the battery in a first, lower pocket, said pocket being connected to a second, upper pocket designated for accepting gas bubbles, which in turn comprises a port for filling with electrolyte by means of a retractable dispensing element. The pouch may be surrounded by a vacuum chamber in the form of a support body so as to create vacuum around the foil pouch while electrolyte fluid is being introduced. After the filling procedure, the dispenser element is retracted, and the foil pouch subsequently sealed.

EP 1 708 295 A2 also describes a method for filling such pouch. Similar to the method described in EP 1 396 037 A2, the pouch is divided into two compartments. Vacuum can be applied to facilitate the filling process; however, this is not accomplished by means of a vacuum chamber surrounding the pouch.

In addition to a filling method in which an electrolyte-containing pouch situated inside an already sealed foil pouch containing the battery or accumulator is torn apart, EP 1 045 463 A1 discloses filling by means of a filling pipe connected via a three-way valve with an electrolyte-reservoir and a vacuum pump. After evacuation, electrolyte is filled and the tube subsequently sealed. The accumulator is then cycled; potentially arising gas bubbles are removed by opening and/or removing the tube once more; after the gas bubbles have been removed, the tube is welded shut again, and the tube connection piece is folded over the packed battery cell.

The filling procedure according to U.S. Pat. No. 6,371,996 B1 is performed in a vacuum chamber. For the filling procedure, one whole side of the foil pouch is kept open; filling is conducted in a holding device. The amount of the electrolyte is measured by a measuring pump and injected into the foil pouch through a nozzle.

Another method proposes to provide the electrolyte with a small amount of a wetting agent, comprising in particular fluorine surfactants. A description of this approach is found in DE 10 2010 020 992 A1. The disadvantage of this method is that this additive may exert negative effects on the electrochemical processes in the cell, which may lead to a reduced service life or gas production under operating conditions.

A further option is to provide the foils with a coating that facilitates capillary action. This may be realized, for example, by use of ceramic-coated separators, as described in DE 10 208 277 A1. The effect is, however, limited and in addition increases the costs for producing the separator.

The object of the present invention is to avoid the aforementioned disadvantages of the prior art, and to provide contamination-free, reproducible, cost-effective, reliable vacuum-electrolyte filling of electrochemical energy storage devices such as batteries, accumulators, and super capacitors ("supercaps") of the form-flexible pouch-cell type that is suitable for any (i.e. even very corrosive and/or reactive) types of fluid electrolytes and can be realized without additional device modifications such as special tube or nozzle designs or material modifications such as coatings or electrolyte additives.

The object is achieved by a method for filling a battery or accumulator foil pouch with fluid and sealing of said pouch, comprising the steps:
(a) providing a flexible foil pouch in the interior of which the solid components of the battery or accumulator are accommodated, wherein the foil pouch is tightly sealed with the exception of a sealable port accessible for fluid,
(b) situating the foil pouch in a gas-tight sealable chamber and gas-tight sealing of the chamber,
(c) following step (b), applying a vacuum in the foil bag,
(d) connecting the fluid access port on the foil pouch to a fluid reservoir via a connecting tube, forming a tight seal,
(e) following step (d), completely filling the pouch interior with fluid via the connecting tube and
(f) hermetically sealing the foil pouch by placing a seam, wherein either
   (i) the seam is placed such that the fluid access port connected to the connecting tube is separated from the interior of the foil pouch and the connecting tube is subsequently removed from the fluid access port, or
   (ii) the seam extends through the connecting tube, and,
(g) separating the foil and/or connecting tube components that are situated outside the seam.

Preferably, steps (c) through (e) are performed consecutively in the aforementioned order.

Preferably, step (d) relates to connecting the fluid access port on the foil pouch with the connecting tube that runs to the fluid reservoir, forming a tight seal.

Preferably, step (f) relates to hermetic sealing of the foil pouch by placement of a seam separating the fluid access port from the interior of the foil pouch, followed by the two steps (g) separating the foil parts(s) situated outside the seam and (h) detaching the tube from the fluid access port in any desired sequence.

More preferably, the latter two preferred embodiments are implemented cumulatively, particularly preferably in combination with the aforementioned preferred order of steps (c) through (e).

The invention is particularly suitable for batteries, accumulators, and supercaps in lithium technology that must be supplied with fluid electrolyte.

The foil pouch can be situated in the gas-tight sealable chamber prior to or after connecting the fluid access port to the tube leading to the fluid reservoir.

Any of the embodiments defined in the appended dependent claims can be preferably combined with the aforementioned preferred embodiments.

Generally, the cathode(s) and the anode(s) in the provided foil pouch are connected to a conductor, which is guided in such a manner through a pre-welded seam of said foil pouch that the cathode(s) and anode(s) are electrically contactable from the outside.

In the figures of the application:

FIG. 1 is a schematic structure of a chamber in which the foil pouch is filled and sealed according to step (f) of variant (i) of the method of the invention. K1 denotes the gas-tight sealable chamber, K2 the entire interior of the cell prior to sealing of the pouch, and K3 the remaining compartment after filling and sealing have been performed. In this embodiment, sealing is conducted within the chamber K1;

Figure 4:
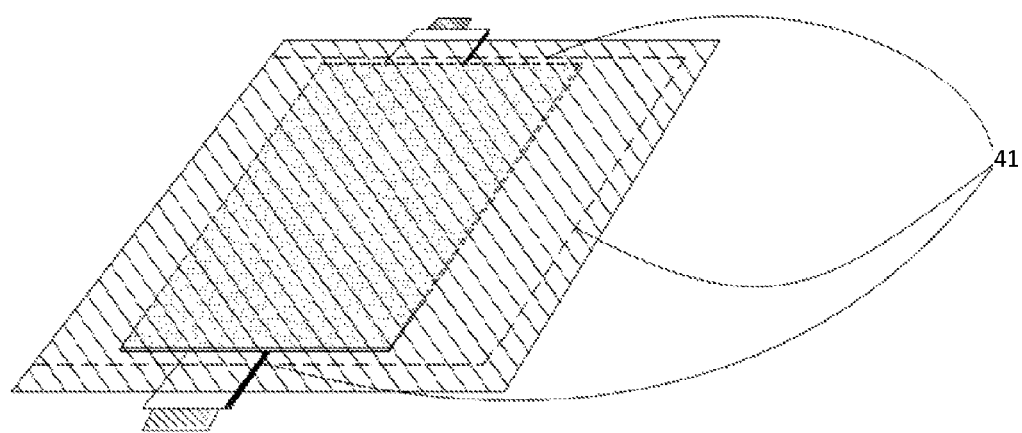
Figure 5:
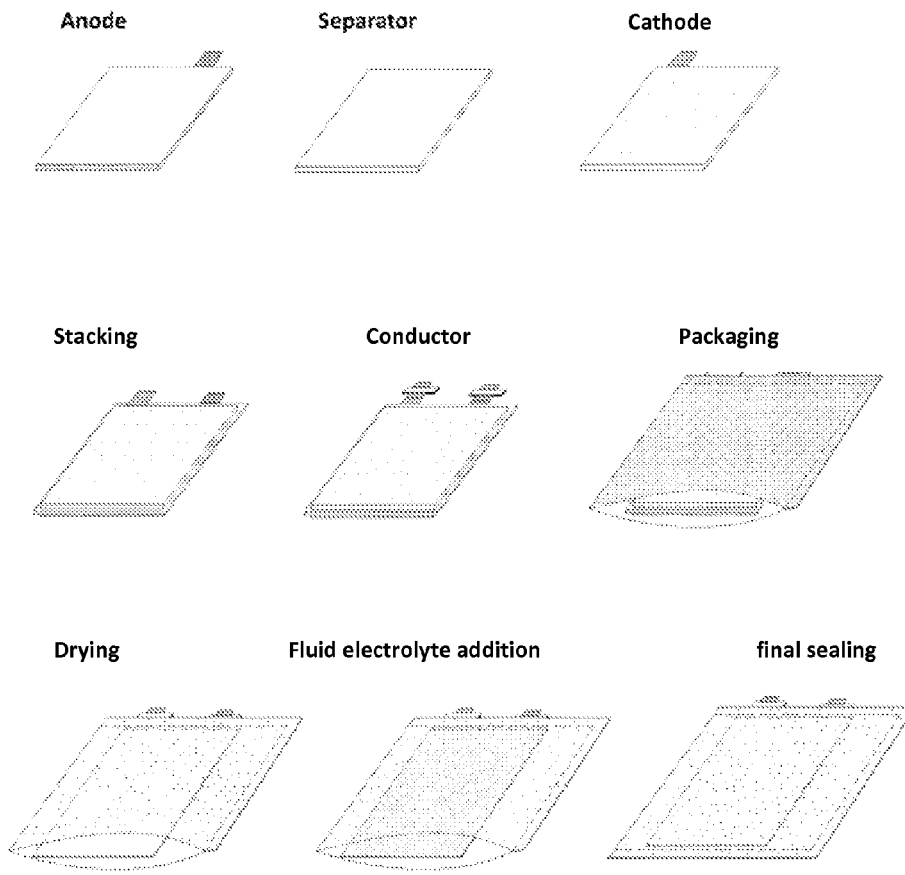
Figure 6:
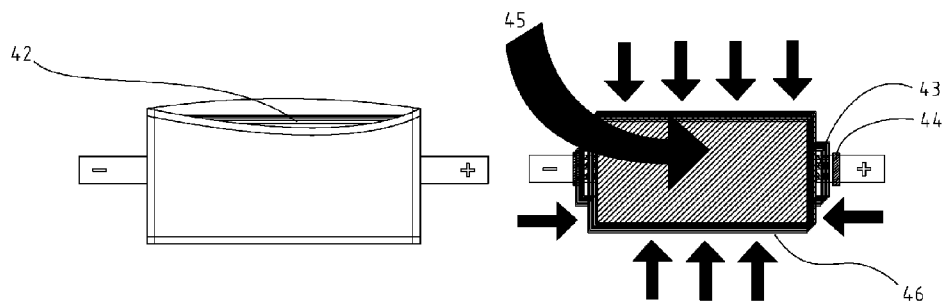
Figure 7:
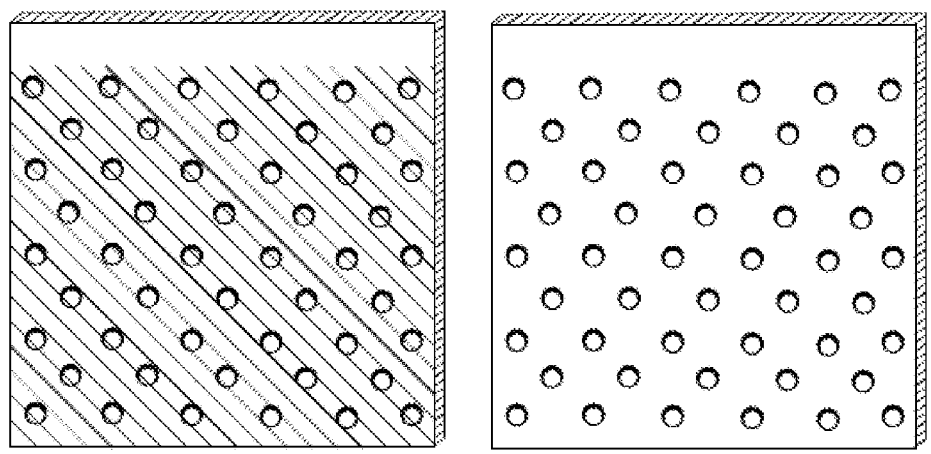
Figure 8:
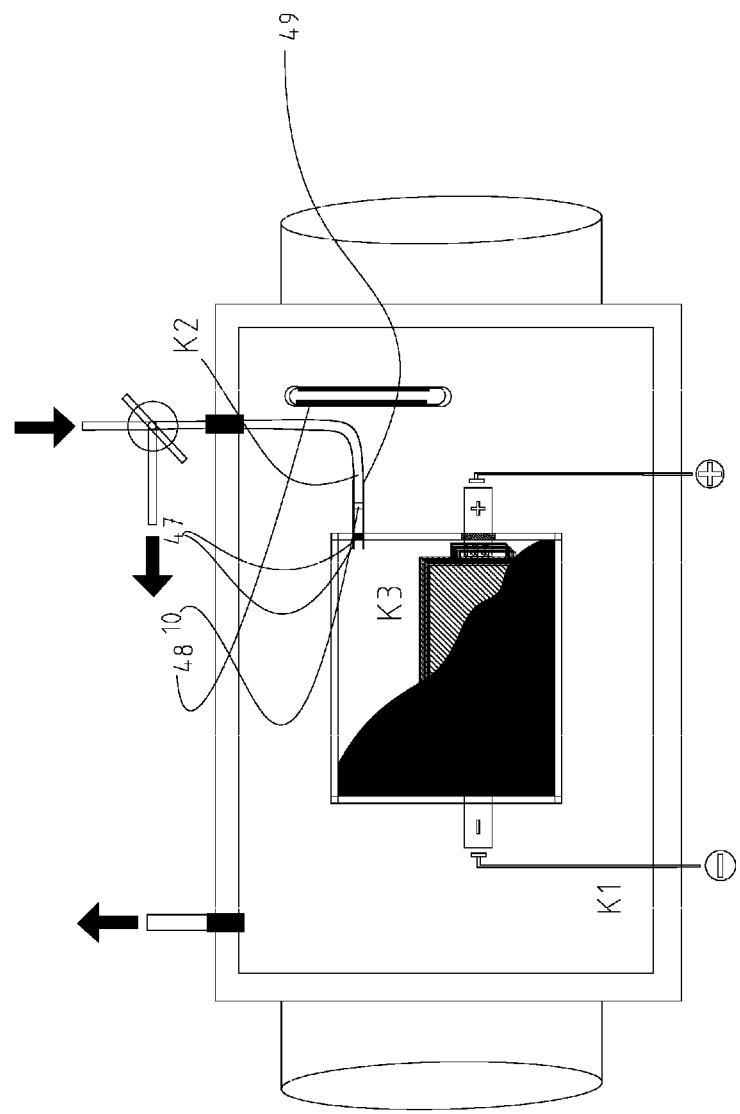

FIG. 4 shows a prepared pouch cell with a three-sided seal including the inserted cell body. The fourth seal is applied in method step (f) according to the invention and is usually not positioned at the very outer edge of the pouch due to the conditions of this method (the tube in the fluid access port often runs into the interior through the fluid access port; also a prior, outer sealing should be possible as is described in more detail below);

FIG. 5 is a schematic representation of the basic steps involved in the manufacturing process of lithium-polymer accumulators of pouch-cell design; the present invention relates to a specific design of only the last two steps;

FIG. 6 shows the access sites for electrolytes for filling of pouch-cell accumulators. It is evident that only a relatively small cross section of access is available, which is why electrolytes must travel and/or overcome a large diffusion distance;

FIG. 7 shows a perforated electrode foil (right: uncoated, left: coated) having an uncoated edge region (top), which is provided in a specific embodiment of the invention;

FIG. 8 is a schematic structure of a chamber in which the foil pouch is filled and sealed according to step (f) of variant (ii) of the invention. K1 denotes the gas-tight sealable chamber and K3 the remaining compartment after filling and sealing. In this embodiment, sealing is performed in the region of the adapter having an extended configuration located within the chamber K1; when an adapter is not used, the seal can instead be placed in the connecting tube itself.

The invention will be explained in more detail with reference to the Figures, in particular to FIG. 1 and FIG. 8, wherein reference is made only for purpose of better understanding, and does not in any way limit the specific features of said figures.

The invention is based on the concept of a strict physical separation of the environment of the cell to be filled (i.e. the lithium accumulator situated in the pouch) that should be gastight and, for example, may be configured as a glove box 21 (closed chamber with glove-access) and foil pouch 6 containing cell body 8 itself (lithium accumulator). Two discrete, preferably separately pressure-regulatable compartments K1 and K2 (FIGS. 1 and 2) are thereby provided. This assembly has a fixed connection between the fluid source reservoir and the cell interior via a connecting tube, also named electrolyte (access) tube, in a manner such that the cell interior together with the tube represents a discrete chamber. Both K1 and K2 compartments are hermetically isolated from one another and can be evacuated separately of one another and, optionally, purged with inert gas.

In the inventive method, the foil pouch is required to exhibit a sealable fluid access port connectable to a tube for introducing the fluid electrolyte. Said sealable fluid access port may, for example, be arranged in one of the seams, in particular in the head (seal), for example when the foil pouch is to be filled in an upright position. In the embodiment of FIG. 1, a vacuum tight adapter is thereby sealed vacuum-tight into an adaptable implementation 11, e.g. a seam and preferably head seal seam 12 of the pouch film packaging ("first embodiment"). As adapter can be used any, preferably standardized, connection system, preferably comprising the adapter itself in combination with an insert piece connectable to a tube or integrally connected thereto, or of said parts. An example thereof is the commercial "Luer-lock" system, in which sealing is ensured by a conical construction. In a second embodiment of the adapter, said adapter may have an oblong shape, for example having a uniform diameter, extending through a suitable seal of the pouch foil packaging, or be in form of a plastic ring, the adapter being configured such that it can accommodate a plastic tube without leak. In this embodiment, the adapter is also usually welded into a seam of the foil pouch. A third embodiment does not employ a separate adapter; rather the end of a tube is welded into an open part of a sealed seam of the foil pouch. The fluid access port can also be implemented in a different manner, for example by gluing a septum to the pouch foil that may be utilized together with a cannula. In a further variation, a thin cannula is passed through the open portion of the pouch and pressed together by means of two clamping jaws comprising elastic material so that gas-tight separation of the cell interior from the ambient atmosphere is ensured.

The fluid access port can be arranged prior to or following an optional drying step of the cell body within the overall process flow, the basics of which are shown in FIG. 5. The filling procedure itself can be carried out under normal atmosphere. The location of the fluid access port is important as in a later step according to variant (f) (i) of the invention the area K2 (FIGS. 1 and 2), on which the adapter 12 is mounted must be separated by a seal from the remainder of the cell body K3, and the meniscus of the electrolyte fluid may not rise up to the level of the fluid access port in any case. When fluid is filled in a standing position, the fluid access port is preferably located at the top or in an upper lateral area of the pouch, in particular in a seam located on the side of this assembly that, as mentioned above, may be the head seam.

The gas-tight, preferably evacuable chamber 21 is prepared for injection in the standing, optionally also lying, position of the pouch accommodating the accumulator cells (the "pouch cell body")

Vacuum is generated in the foil pouch 6 before the fluid is filled. This may either be accomplished by evacuating chamber 21, provided the compartments K1 and K2 (FIGS. 1 and 2) are not yet separated by connecting the fluid source reservoir connected to the pouch interior via connection tube 14 and/or electrolyte tube 14, e.g. by the insertion of said tube into fluid access port 12, or in another manner described below. Preferably, vacuum in the foil pouch 6 is then first disrupted by introduction of a protective gas (preferably a dry inert gas such as nitrogen or argon), and the evacuation optionally repeated several times, the vacuum in each event being interrupted by inert gas so as to ensure complete replacement of the gas volume within the cell with an inert gas and achieving a drying effect. To this end a connection (tube) 19 may be employed that leads to a vacuum, preferably a vacuum pump with pressure regulation, through the wall of chamber 21 by way of a vacuum-tight feed-through 20.

Chamber 21 itself is preferably equipped with two vacuum-tight feed-throughs 4,5, one of which (4) being provided for mounting the device to the cells to be filled and the other (5) for discharging the cells after filling and an optional sealing step. Within the chamber said electrolyte tube 14 is available, e.g. being connected and/or connectable fluid-tight, preferably also gas-tight to the fluid access port in the foil pouch, and connected and/or connectable via connection 17 to a storage reservoir or metering vessel for the electrolyte fluid. In the first and second embodiment of the adapter, said electrolyte tube is usually a tube having dimensions allowing sealing insertion into the adapter and/or adapter insertion component; said tube is already connected to the storage reservoir via connection 17. In the third embodiment, the electrolyte tube itself, in the form of a plastic tube, is already welded into a sealed seam of the foil packaging; in this embodiment the electrolyte tube is then subsequently connected to the electrolyte fluid reservoir. Once the filling has been performed and an optionally provided stopcock 13 separating compartment K2 (FIGS. 1 and 2) has been preferably closed, the interior of said tube forms a fourth compartment K4. The storage reservoir (not shown in FIG. 1) may be located on the inside or outside of said chamber; for reasons of tightness of chamber 21, it is advantageously situated in the interior. For the third embodiment, an arrangement inside the chamber is not mandatory, but standard, because only then can a simple connection of the welded electrolyte tube with the electrolyte storage reservoir be accomplished; if the storage container is, however, located on the outside of the vacuum chamber, it must be "threaded" to the outside through a port to establish the connection. If the storage container is nevertheless arranged outside chamber 21, it is in any case accessible via a vacuum-tight feedthrough 15, e.g. through the aforementioned port through which the electrolyte tube 14 extends to the outside.

In a preferred embodiment of the invention, the connection to the storage container may be closed/separated, and in addition, electrolytic tube 14 is also separably connected to a vacuum source (reference number 18). This is achieved, for example, by means of a three-way valve with an l-bore 16. In this embodiment, in which the connection between tube 14 and access port 11, 12 is preferably be configured gas-tight, at least to some extent, the vacuum in the foil pouch can be produced by connecting the sealable access port on the foil pouch with said tube and opening of the tube to the vacuum source, after which the tube is closed towards the vacuum source and connected to the fluid reservoir so as to fill the pouch interior with fluid. If the aforementioned tube is further in contact with a closeable protective gas source, alternate steps of evacuation and purging with a protective gas can be accomplished in this way, as described above. This purging with inert gas can, for example, be realized by an additional three-way valve positioned in the vacuum line.

The pressure in gas-tight sealable chamber 21 can be suitably adjusted prior to the steps above. In particular, a vacuum can be applied. This can either be applied using the above-described vacuum and subsequent fluid tube 14, provided this tube has not yet been inserted into the access port on the foil pouch. Alternatively, chamber 21 can be connected to a separate vacuum device and evacuated as described above. A particular advantage of the aforementioned assembly is that a very low final pressure in the foil pouch can be generated by simultaneously evacuating the chamber and pouch, or by evacuating chamber 21 prior to application of the vacuum in the pouch, because any existing leaks in the area on the access port of the foil pouch (e.g. adapters) are exposed to only small relative differences in pressure. In addition, a separate vacuum tube for chamber 21 is advantageous when the fluid electrolyte tube has only a small inner tube diameter because in this case the pressure reduction occurs faster with support from the ambient pressure reduction, which has great advantages for the cycle times.

According to the above-described preparations—in particular the reduction of the internal pressure within the cell (pressure conditions in K2 (FIGS. 1 and 2)) and optionally following simultaneous reduction of the ambient pressure, i.e. the pressure in the surrounding chamber (pressure conditions in K1)—filling with electrolyte begins. For this purpose, vacuum port (18 and/or 19) used to evacuate the inside of the cell is optionally closed and the connection between the fluid electrolyte tube and an electrolyte reservoir is opened (16). Due to the vacuum in the foil pouch, the electrolyte is thereby "voluntarily" drawn into the evacuated pores of the electrode and electrolyte foils of the battery or accumulator body 8. If necessary, the pressure in surrounding chamber 21 (K1) may be slightly reduced (e.g. between 100 mbar and 800 mbar) so as to promote rapid drawing in of the electrolytes into the interior of the cell. The sensitive adjustment of the pressure in the compartment K1 ensures rapid drawing in of the electrolyte, depending on the electrolyte system employed, but not to an undesired evaporation of solvent components.

Due to the form-flexible pouch cell design of the electronic storage elements, relative pressure changes between the individual compartments effect the pressure situation in the other respective compartment. Due to the pressure conditions in the compartment K1, the speed with which the electrolyte is infused into the interior of the cell can be adjusted and metered without a positively driven operator, such as a maintenance and repair-prone electrolyte pump.

In a preferred embodiment, the electrolyte is metered from a reservoir into a buffer vessel (for example per volumetric scale or by a flowmeter). The buffer vessel is characterized, for example, by being emptied following electrolyte consumption such that the dead volume in the electrolyte tube is filled at the end of the filling process with inert gas, which is layered over the buffer vessel. The connection to the buffer vessel is thereby preferably closed in the precise moment at which the meniscus of the electrolyte has reached the sealable access port on the foil pouch.

After the pouch is filled with the preferably metered amount of electrolyte said pouch is closed by the application of a seal seam 10 or the like, that is geometrically configured such that either the access port for fluid becomes separated from the interior of the foil pouch (variant (i) in step (f)) or such that the electrolyte tube itself is closed (variant (ii) in step (f)). Thus, compartment K3 becomes separated from compartment K2 (FIGS. 1 and 2). This may, for example, may be accomplished by provision of a sealing station 9 in the interior of the chamber 21 or outside of the chamber (e.g. in another chamber 23, preferably protected with inert gas (compartment K5), which is accessible from chamber 21 via a preferably vacuum-tight passage 24 and may exhibit an inert gas supply and/or supply by a gas purification means 25 as well as a suction and/or supply tube to the gas purification means 26, see FIG. 2). In the latter case, the electrolyte tube must be long and flexible enough that it is able to remain in the sealable access port when the foil pouch is removed from the filling port, see reference numeral 22 in FIG. 2. If during sealing the electrolyte tube itself is sealed, said sealing may vary depending on the design: If the fluid access port of the foil bag comprises an adapter into which a tube was inserted forming a tight seal, the sealed seam may be applied either at the level of the seam of the foil packaging such that a continuous seam then extends along the length of the packaging, or it may be placed further outside and thus outside of the foil pouch as shown in FIG. 8. In this case, this adapter is destroyed so that in this embodiment said adapter is preferably comprised of an economically producible, sealable plastic tube or the like.

The same applies in the event an adapter is not present, and the tube was sealed into the sealed seam of the foil packaging. In this case, following sealing, the connection between the tube and the fluid storage reservoir is separated again at an appropriate time.

After placing of the seal or the like, there is provided an electrochemical storage element, e.g. an accumulator, fully enclosed in a foil pouch. Said element can be completed by separation of the foil component and/or the adapter and/or tube located outside of the seam. If the seal seam has separated access for fluid from the interior of the foil pouch, the connected tube is removed from the separated or to be separated component, so that the fluid electrolyte-tube—in its full length—is available again for further filling processes. An optionally present adapter that is still intact after sealing can also be reused. Provided the seal seam travels through the adapter and/or the tube employed as electrolyte tube, but does not separate the inner compartment of the foil pouch, said tube may be separated above the seam, e.g. cut off above the seal seam. Separation of said parts located above the seam may, however be postponed to a later time in the—frequent—cases in which, as described below, the cell is later cycled and then sealed again. After this last sealing step, the foil located outside of the seam thereby formed is separated from the foil pouch; although it is possible to perform this separation step separately from the aforementioned step, it is not necessary. Rather, the superfluous or interfering parts of the foil pouch, and optionally of the adapter or portions thereof and/or a protruding part of the electrolytic tube can then be removed in a single step.

The aforementioned invention results in a cell body being advantageously wetted and penetrated with electrolyte, as the inventive method allows for a very low final pressure. Contamination of the cell environment and evaporation of the solvent contained in the electrolyte is precluded by the filling principle employing discrete compartments. Moreover, the entire accumulator is developed entirely gas-free following this method and thus guarantees a high mechanical cohesion of the coatings and advantageous electrochemical properties in the development of the accumulator that generally follows.

The method described above can be performed on single cells/foil bags. In a specific embodiment, a plurality of cells/foil bags are filled in parallel in one identical chamber, whereby a separate fluid tube must be provided for each of these cells/foil pouches. In another specific embodiment, the cells/foil pouches are continuously filled and, after being filled, automatically transported to a sealing station; after the outer parts have been separated downstream of the sealing station, the fluid tubes may optionally be retracted back into the first chamber.

As described above, the anode(s) and cathode(s) of the battery and/or accumulator stacks are electrically contactable through conductors that extend through the foil package. In the majority of the cases, said conductors are shown in the figures with their polarities (+ and −). Said conductors are usually thin metal plates that are welded to the current collectors on the electrodes or are otherwise connected thereto, or formed together as an integral part. Current collector plates can also be designed such that for the purpose of contacting they extend through the seam or the wall of the pouch foil packaging. In a specific embodiment of the invention, the now assembled and completed accumulators are performed with the help of said conductors prior to, or following, the separation of foil components that are located outside of the newly placed seal seam. To this end the conductors are contacted by a means for preformation 7 (FIGS. 1 and 2) and applied with a potential such that the cell charges and discharges one or even more times. In this first cycle and/or cycles of charging and discharging electrolyte reactions take place with the surface of the electrodes, which then receives a passivation coating. In the course, gas may develop. If the cells are still standing upright or standing upright again, the gas bubbles rise to the top. Preferably, a further sealed seam is then applied subsequent to pre-forming, namely below the top sealed seam, and at a distance therefrom that there are no remaining gas bubbles in the accumulator foil pouch after sealing. This embodiment is illustrated in FIG. 3. An evacuable chamber 39 is apparent having a connection 27 to a vacuum pump and to a protective gas supply in which a cell body (accumulator stack) 31 is arranged inside a partially closed pouch foil with sealed seams 32. According to this figure, the filling is not performed according to the invention but via a syringe-like filling means 28 having an electrolyte tube 29 and pressure-proof guiding through the chamber wall and a stop valve 30. Anode and cathode conductor sheets 33 are of significance in the present embodiment described. These are contacted via the pre-formation means 404. After the pre-formation, a second sealed seam 36 is placed is below the first sealed seam 38 so as to separate potentially resulting gas bubbles, and the pouch foil is separated between the two sealed seams, 38 and 36. This step, as explained above, may comprise separating the foil and/or connection tubes that are situated outside the first seam.

The combination of pre-formation according to the inventive method is particularly advantageous since the entry of vaporizing organic solvents into the surrounding compartments (e.g. K1 in FIG. 1) is precluded. This circumstance is especially suitable to keep the apparatus expenses very low that are required per ATEX directives.

In a further embodiment of the method according to the invention, the entire filling device can be integrated inside the airlock of a commercial glove box with little effort. The sealing unit, as is common practice for accumulator assembly, may also be placed inside the glove box.

In one embodiment of the invention that may be combined with any of the other embodiments, the adapters are constructed as Luer lock connections comprised of PE or PP, and are welded into the sealed seam by means of a specially shaped sealing bar.

In a specific advantageous embodiment of the method described for filling electrolyte that can be combined with any of the embodiments described above, electrodes are used, which are deposited on the apertured metal foils rather than electrodes that are deposited on closed metal foils. The advantage is firstly a reduced weight of the current conductor, which provides an advantage in terms of gravimetric energy density, and secondly, an apertured metal foil is at times more elastic and can therefore more readily follow the volume changes that occur during intercalation and deintercalation of lithium without leading to delamination of the electrode material. A third advantage is that the penetration of the fluid electrolyte into the battery or accumulator body is facilitated. Apertured metal foils may generally also be directly coated.

To produce the openings, the metal sheets are perforated, for example, by mechanical punching tools or by lasers. This perforation is constructed with a view to the viscosity of the electrode mass paste to be applied such that the hole sizes are designed in a manner that during the coating process the passage of the paste (cast) through the openings is avoided that would lead to contamination of rollers and/or seeping through of not yet dried coating mass in the drying section of the coating apparatus. This can be ensured by suitable adjustment of the viscosity of the paste in relation to the perforation hole size and the density of perforation holes. If, for example, pasty materials with rheological properties that are characterized by Herschel/Bulkey indices (flow limit between 2 and 20 1/s), flow coefficient between 0.1 and 1.0 and index between 0.6 and 0.9) are used, suitable hole diameters are between about 5 μm and 500 μm. Advantageously, pasty compositions based on volatile organic solvents are employed. This type of perforation can also be designed such that the perforated areas are arranged in a manner that in areas outside the coated areas perforation does not occur. This allows a much higher particulate-free processing in the formative cutting of the electrode foil elements during the construction of the cell and/or during welding on uncoated areas for connecting foil elements and/or connecting through elements (tabs in the sealed seam in FIG. 1) with the battery and/or accumulator body.

The invention enables the implementation of a contamination-free, reproducible, more productive, cost effective and reliable vacuum electrolyte filling of batteries and accumulators of the pouch cell type under defined pressure conditions, with a freely selectable electrolyte system (the many standard and well-known systems known to the skilled person have different melting points, boiling points, vapor pressures and viscosities). To this end, the hermetic separation of the different compartments and the independently adjustable pressure condition in these compartments are important. The compartments are separated by a foil pouch, which is flexible in shape, and adjustable to pressure effects.

The method of the invention does not require forced feeding (i.e. it does not require a pump), is contamination-free (due to the separation of the various compartments) and is highly effective (due to improved penetration of the electrolyte into the pores of the accumulator layers and due to the low final pressures that can be reached). The arrangement used in this case is equally cost effective as the required consumables; moreover, it also has little susceptibility to wear. The method can be performed using any cell geometry; it is independent of the type of electrolyte used, which may thus be extremely corrosive and/or susceptible to hydrolysis. The method is suitable for large unit volume because of its ability for parallelization. On the other hand, the method can be conveniently employed for small series as it can be performed in a conventional glove box environment. It is particularly preferred to use the method for accumulators, the electrodes of which are applied as coatings on perforated substrates (current collectors, conductors) that may have foil character. The method is particularly well suited in combination with a pre-forming step as described above.

LIST OF REFERENCE NUMERALS

Figure 1:
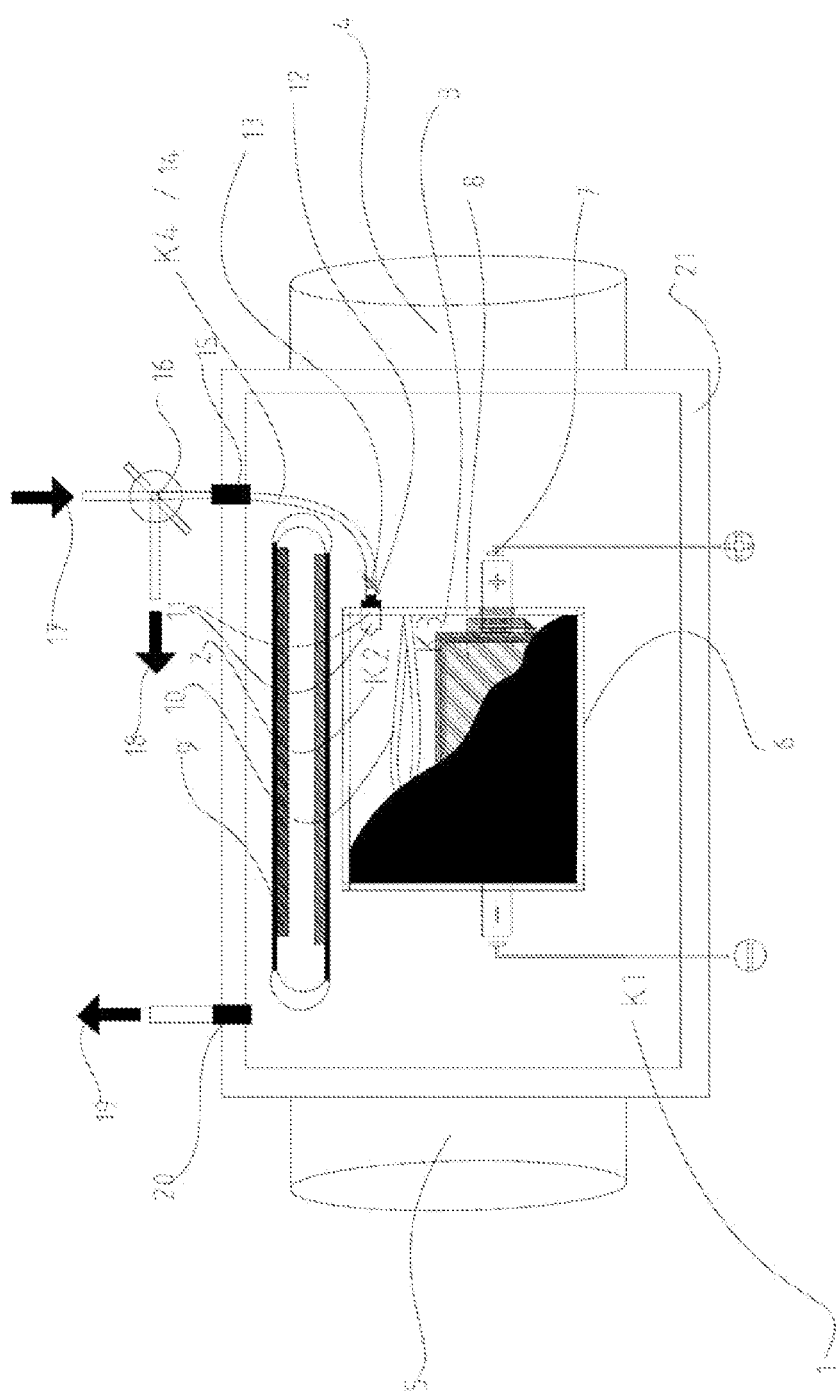
Figure 2:
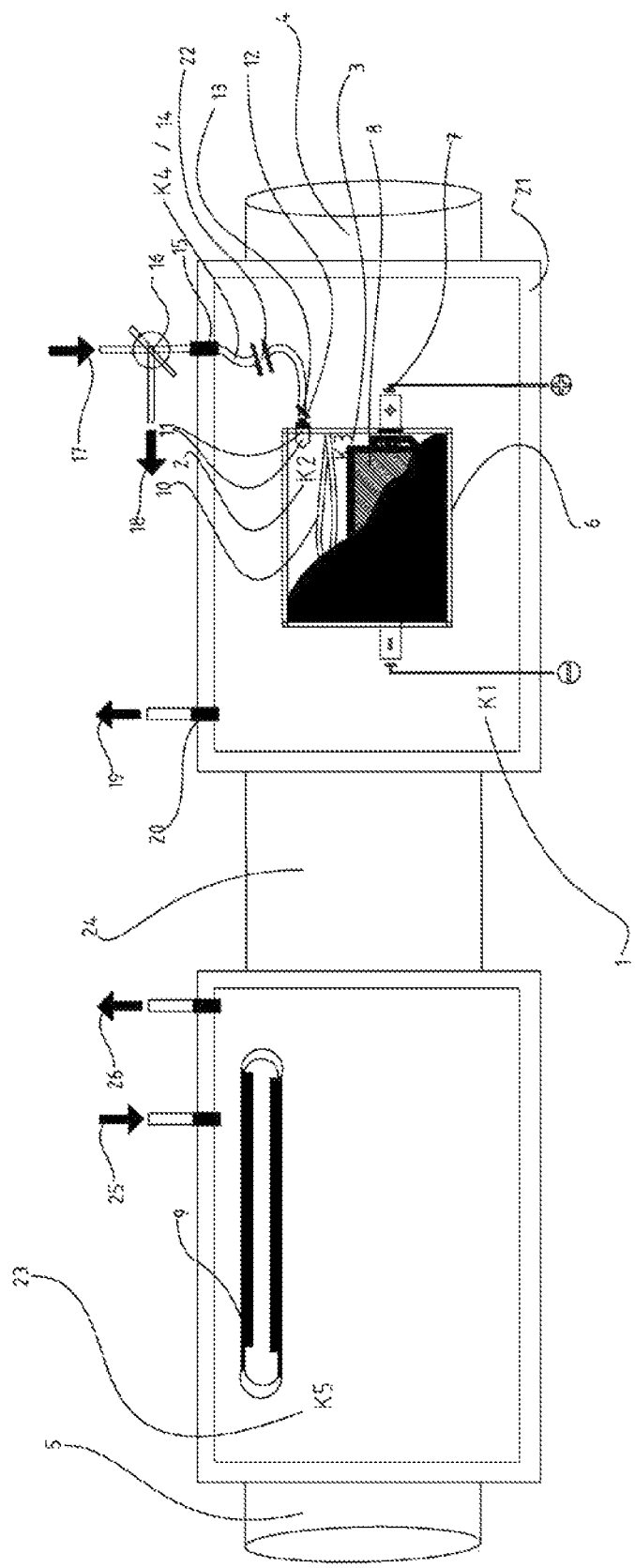
FIG. 2 shows an alternative embodiment of variant (i) with the sealing station separating the compartment K1 from the compartment K3 being positioned outside of the chamber.
Figure 3:
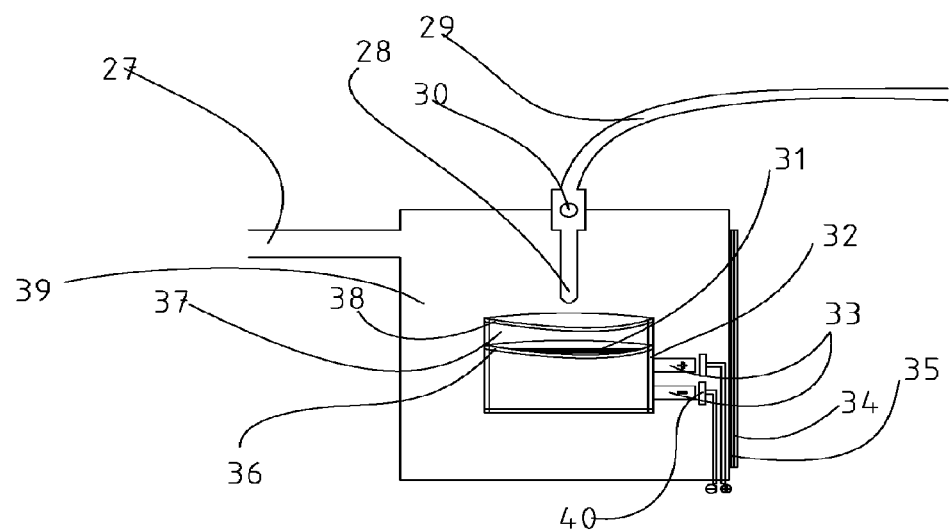
FIG. 3 is a schematic representation of vacuum electrolyte filling with subsequent pre-forming and double sealing.

FIG. 1 Compartment 1 (total cell environment)
2 Compartment 2 (cell interior during preparation for filling and during filling)
3 Compartment 3 following completed filling and sealing
4 Vacuum-tight implementation for populating the filling apparatus with cells
5 Vacuum-tight implementation for discharging filled cells
6 Cell closed on all four sides by sealing
7 Optional device for pre-forming filled cells
8 Cell body in a closed pouch packaging
9 Sealing and cutting device for separating compartment 3 from compartment 2 after filling
10 Intended position of the sealed seam separating compartment 3 from compartment 2 to be placed after filling
11 Vacuum-tight introduced adaptable implementation
12 Vacuum-tight adapter
13 Stop-cock for separating compartment 4 from compartment 2 after filling
14 Compartment 4 after performed filling and sealing of 13
15 Vacuum-tight implementation of the electrolyte/vacuum supply tube
16 Three-way valve (L-bore) for evacuation and filling of compartment 2 with electrolyte
17 Connection to electrolyte supply/dosing container
18 Connection to pressure-controllable vacuum pump I
19 Connection to pressure-controllable vacuum pump II
20 Vacuum-tight implementation
21 Vacuum-tight housing for separating compartment 1 from the environment
FIG. 2 Reference numerals 1 to 21: see FIG. 1
22 Excess connection tubing for the transfer of the cell into compartment 5
23 Protected gas compartment 5 for unsealing the cell and separation from compartment 3
24 Vacuum-tight implementation of compartment 1 as inert gas protected compartment 5
25 Protective gas supply and/or supply of a gas purification means
FIG. 3 27 Connection to the vacuum pump and inert gas supply
28 Syringe-like filling means
29 Electrolyte tube
30 Pressure-tight implementation with shut off valve
31 Cell body (electrode foil stacking)
32 Pouch foil sealed seams
33 Anode and cathode conductor plates
34 pressure-resistant opening device
35 Pressure-tight boundaries of the filling device
36 Later sealed seam for final closing of the cell
37 Pouch foil excess for receiving gas
38 Integrated sealing step for the first closing of the cell
39 Evacuatable compartment 1
40 Optional device for pre-forming
FIG. 4 41 sealed seams
FIG. 6 42 Foil stacking in a cell sealed on three sides prepared for electrolyte filling
43 Contact-area of electrode foils<–>Tab
44 Sealing area for pouch foil packaging
45 Impossible/impeded penetration path for electrolyte when closed and/or perforated substrate material is employed
46 Cell bodies (stacking layer of anodes, separators, cathodes with contacted Tabs)
FIG. 8 47 Oblong shaped adapter with vacuum-tight lead-through into the cell interior through sealed seam
48 Scaled-down sealing and cutting device for separating compartment 3 from compartment 2 after filling by (squeezed) sealing in the area of the elongated adapter.
49 Elongated vacuum-tight adapter in the form of a welded tube into which the electrolyte tube can be inserted, forming a tight seal. Alternatively, the electrolyte tube itself
may be welded into the opening in the seal and
10 Possible position of the sealed seam to be placed after filling for separating compartment 3 from compartment 2

What is claimed is:
1. Method for filling a battery or accumulator foil pouch with fluid and sealing of said pouch, comprising:
a) providing a flexible foil pouch in an interior chamber of which solid components of the battery and/or accu- mulator are accommodated, wherein the foil pouch is tightly sealed with the exception of a sealable fluid access port,
b) situating the foil pouch in a gas-tight sealable chamber and gas-tight sealing of the chamber,
c) following step (b), applying a vacuum in the foil bag,
d) connecting the fluid access port on the foil pouch to a fluid source reservoir via a connecting tube, forming a tight seal,
e) following step (d), completely filling the pouch interior with fluid via the connecting tube and
f) hermetically sealing the foil pouch by placing a seam, wherein either
   (i) the seam is placed such that the fluid access port connected to the connecting tube is separated from the interior of the foil pouch and the connecting tube is subsequently removed from the fluid access port, or
   (ii) the seam extends through the connecting tube, and,
g) separating foil and/or connecting tube components that are situated outside the seam.

2. Method according to claim 1, wherein the solid components of the battery or accumulator are electrically contactable from the outside by cathode and anode conductors guided through a previously closed seam.

3. Method according to claim 1, wherein the seam placed in step (f) is a sealed seam.

4. Method according to claim 3, wherein the sealed seam is placed in a sealing station located inside or outside of the gas-tight sealable chamber.

5. Method according to claim 1, wherein the foil pouch is filled with fluid when in an upright position, and the sealable fluid access port is located on the head side on the foil pouch.

6. Method according to claim 1, wherein the sealable fluid access port is an adapter in which a tube can be introduced forming a tight seal, with the adapter being secured by means of a seam, in particular a weld seam, to the foil pouch.

7. Method according to claim 1, wherein a vacuum is generated in the gas-tight sealable chamber simultaneously with, or prior to, a vacuum being generated in the foil bag.

8. Method according to claim 1, wherein the connection between the tube and the fluid source reservoir is separable and the tube is in continued separable contact with a vacuum source, wherein the vacuum in the foil pouch can be produced by connecting the fluid access port of the foil pouch with said tube and opening of the tube to the vacuum source, after which the tube is closed towards the vacuum source and connected to the fluid reservoir so as to fill the pouch interior with fluid.

9. Method according to claim 8, wherein the gas-tight sealable chamber is evacuated via the tube that is in contact with a vacuum source prior to said tube being connected to the fluid access port on the foil pouch, forming a tight seal.

10. Method according to claim 1, wherein the gas-tight sealable chamber is evacuable via a separate vacuum tube.

11. Method according to claim 10, wherein the foil pouch bag is evacuated in step (c) together with the gas-tight sealable chamber in a vacuum tube of the gas-tight sealable chamber, and step (d) is carried out thereafter.

12. Method according to claim 1, wherein, following a first generation of vacuum in the foil pouch said foil pouch is at least once purged with protective gas and vacuum applied thereafter once more.

13. Method according to claim 1, wherein in step (e) the fluid from the fluid source reservoir is metered into a buffer vessel to which an inert gas buffer is applied, the buffer vessel being emptied by the filling of the pouch interior such that the dead volume in the tube leading to the fluid reservoir is filled at the end of filling with inert gas, wherein the metering is preferably carried out by means of a scale or a volumetric flow device.

14. Method according to claim 13, wherein the connection between the buffer vessel and pouch bag interior is closed when the meniscus of the fluid has reached the fluid access port on the foil pouch.

15. Method according to claim 2, wherein the foil pouch is filled with fluid when in an upright position, and the sealable fluid access port is located on the head side on the foil pouch, additionally comprising pre-forming of the accumulator following the hermetic sealing of the foil pouch, placing of an inner seam with which an upper part of the bag interior with gas bubbles possibly contained therein is physically separated, and removing of foil component(s) located outside the inner seam.

16. Method according to claim 1, wherein the solid components of the battery or accumulator comprise electrodes arranged on a perforated conductive substrate.

17. Method according to claim 16, wherein each of the electrodes is prepared by applying a paste-like electrode material onto a perforated conductive substrate being subsequently dried and/or cured.

18. Method according to claim 5, wherein the sealable fluid access port is an adapter in which a tube can be introduced forming a tight seal, with the adapter being secured by means of a seam, in particular a weld seam, to the foil pouch.

19. Method according to claim 8, wherein in step (e) the fluid from the fluid source reservoir is metered into a buffer vessel to which an inert gas buffer is applied, the buffer vessel being emptied by the filling of the pouch interior such that the dead volume in the tube leading to the fluid reservoir is filled at the end of filling with inert gas, wherein the metering is preferably carried out by means of a scale or a volumetric flow device.

* * * * *